US012728797B2

(12) United States Patent
Povinelli et al.

(10) Patent No.: US 12,728,797 B2
(45) Date of Patent: Sep. 8, 2026

(54) DEPLOYABLE RUNNING BOARD WITH STRUCTURAL AND STEP INTEGRATION

(71) Applicant: Magna Exteriors Inc., Aurora (CA)

(72) Inventors: Anthony J. Povinelli, Romeo, MI (US); Jeffry J. Zielinski, Lake Orion, MI (US); Mark T. Pilette, Oxford, MI (US); Jeffrey R. Johnson, White Lake, MI (US)

(73) Assignee: Magna Exteriors Inc., Aurora (CA)

( * ) Notice: Subject to any disclaimer, the term of this patent is extended or adjusted under 35 U.S.C. 154(b) by 279 days.

(21) Appl. No.: 18/261,616

(22) PCT Filed: Jan. 27, 2022

(86) PCT No.: PCT/US2022/014064
§ 371 (c)(1),
(2) Date: Jul. 14, 2023

(87) PCT Pub. No.: WO2022/165010
PCT Pub. Date: Aug. 4, 2022

(65) Prior Publication Data

US 2024/0075882 A1 Mar. 7, 2024

Related U.S. Application Data

(60) Provisional application No. 63/142,282, filed on Jan. 27, 2021.

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| | | | | |
|---|---|---|---|---|
| 8,833,781 | B2 | 9/2014 | Hayes | |
| 9,771,024 | B2 | 9/2017 | Hayes et al. | |
| 10,272,842 | B2 | 4/2019 | Du et al. | |
| 10,377,313 | B1 * | 8/2019 | Brunner .................... | B60R 3/02 |

(Continued)

FOREIGN PATENT DOCUMENTS

CN 211543397 U 9/2020

OTHER PUBLICATIONS

International Search Report for PCT/US2022/014064 mailed May 11, 2022, 1-page.

(Continued)

*Primary Examiner* — Erez Gurari

(57) ABSTRACT

A combination step and obstacle side guard for a vehicle has a first hollow housing portion including an outer robust housing which has a top surface step and bottom obstacle guard surface and a side surface. The side surface including outer edges and forming an inset cavity. An automated deployable running board which has a step portion which is stowed in the inset cavity. A drive linkage mechanism is situated within and protected by said hollow portion of said first hollow housing portion for driving the step between a stowed position in the inset cavity and a deployed step position wherein the step portion can be used for stepping into the vehicle.

9 Claims, 4 Drawing Sheets

(56) References Cited

U.S. PATENT DOCUMENTS

| | | | | |
|---|---|---|---|---|
| 12,330,571 | B2 * | 6/2025 | Salter | B60R 3/002 |
| 2007/0069497 | A1 * | 3/2007 | Watson | B60R 3/02 280/166 |
| 2013/0154230 | A1 * | 6/2013 | Ziaylek | B60R 3/02 280/166 |
| 2016/0288718 | A1 * | 10/2016 | Hayes | B60R 3/02 |
| 2016/0355138 | A1 * | 12/2016 | Smith | B60R 19/42 |
| 2017/0036607 | A1 * | 2/2017 | Du | B60R 3/02 |
| 2017/0320419 | A1 * | 11/2017 | Gobart | B60N 3/02 |
| 2018/0065560 | A1 * | 3/2018 | Krishnan | B60R 3/02 |
| 2018/0257572 | A1 * | 9/2018 | Du | B60R 3/002 |
| 2019/0389386 | A1 * | 12/2019 | Meszaros | B60R 3/005 |
| 2020/0361389 | A1 | 11/2020 | Leitner et al. | |
| 2024/0075882 | A1 * | 3/2024 | Povinelli | B60R 3/002 |
| 2024/0174190 | A1 * | 5/2024 | Salter | B60R 19/18 |
| 2024/0174191 | A1 * | 5/2024 | Salter | B60R 19/54 |

OTHER PUBLICATIONS

EP Communication for EP22713475.6 dated Aug. 28, 2025, 2-pages.

EP Third Party Observation for EP20220713475 dated Sep. 11, 2025, 7-pages.

CN Office Action for CN Application No. 202280011565.2 dated Jan. 29, 2026 (14 pages).

* cited by examiner

DEPLOYABLE RUNNING BOARD WITH STRUCTURAL AND STEP INTEGRATION

CROSS-REFERENCE TO RELATED APPLICATIONS

This application is a National Stage of PCT International Patent Application No. PCT/US2022/014064, filed Jan. 27, 2022 and claims the benefit of U.S. Provisional Patent Application No. 63/142,282, filed Jan. 27, 2021. The disclosure disclosures of the above application applications are incorporated herein by reference.

FIELD OF THE INVENTION

The present invention relates to a side inset automated running board.

BACKGROUND OF THE INVENTION

Running boards are common on SUV and pickup truck vehicles manufactured today. In the more robust vehicles which are designed with a view toward off road uses such as rock climbing and trail riding the running boards are used as nerf bars or rock guards such that if a rock is encountered on the trail or the like the running board is robust enough to take the contact with the rock and protect the vehicle body such that the vehicle can traverse the rock, bounce off the rock or slide along the rock without injuring the body of the vehicle. Typically, such vehicles have lifted suspensions and are challenging to get in and out of.

Therefore, it is a goal in the art to provide an automated running board mechanism in a robust side step of a vehicle which will allow a lowered step to get into such a vehicle but can still be robust enough to withstand impacts from rocks and other obstacles which might come in contact with the step.

SUMMARY OF THE INVENTION

A combination step and obstacle side guard for a vehicle. A first hollow housing portion including an outer robust housing which has a top surface step and bottom obstacle guard surface and a side surface is provided. The obstacle guard surface includes outer edges and forms an inset cavity. The step and obstacle side guard includes an automated deployable running board which has a step portion which is stowed in the cavity. A drive linkage mechanism is provided which is situated within and protected by the hollow portion of the first hollow housing portion. The drive mechanism is for driving the step between a stowed position in the inset cavity and a deployed step position wherein the step portion can be used for stepping into the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
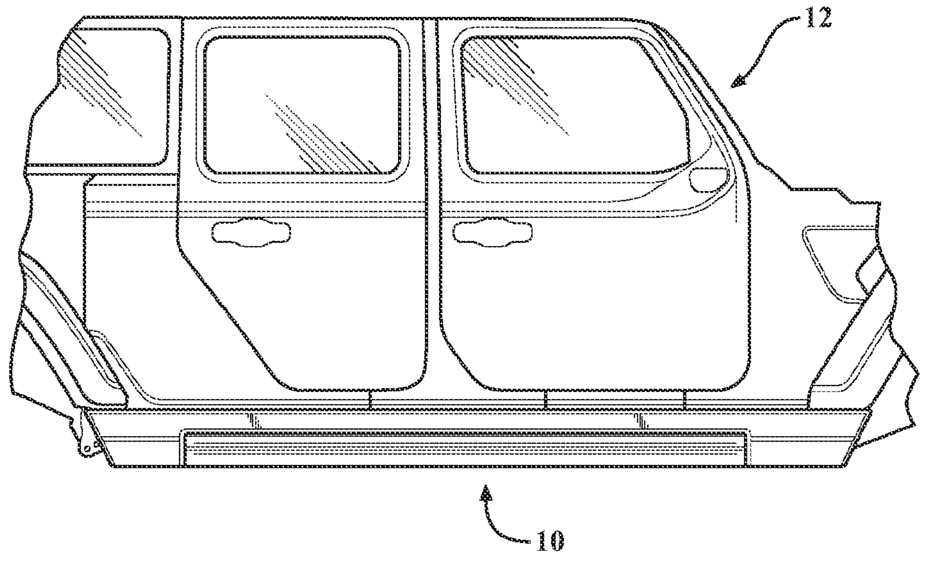
FIG. 1 is a is a side view of an SUV vehicle including the combination step and obstacle side guard of the present invention.
Figure 2:
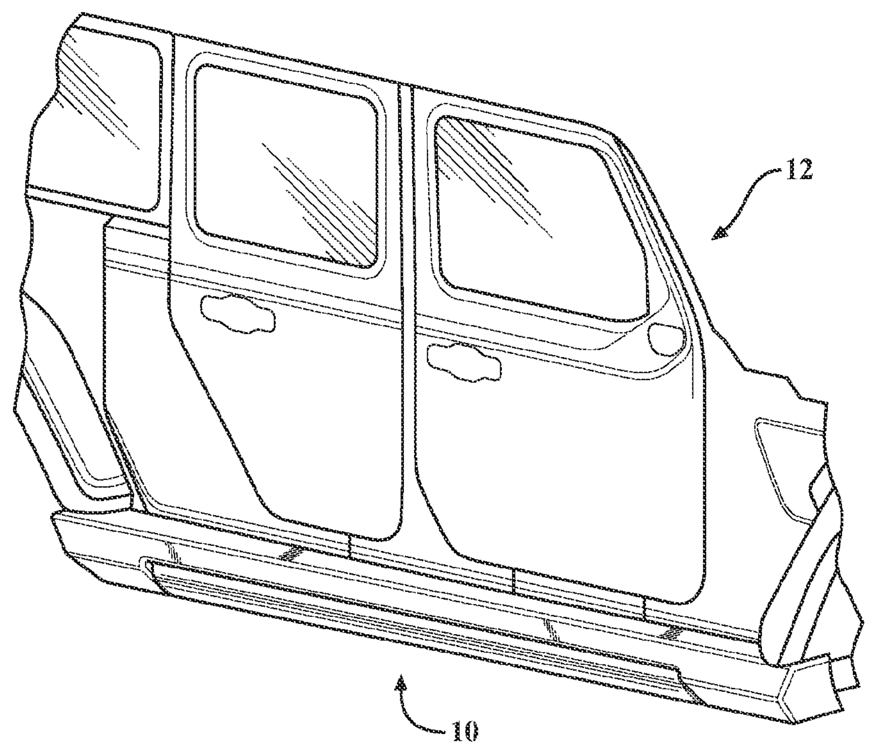
FIG. 2 is a front side perspective view of the SUV vehicle including the combination step and obstacle side guard of the present invention.
Figure 3:
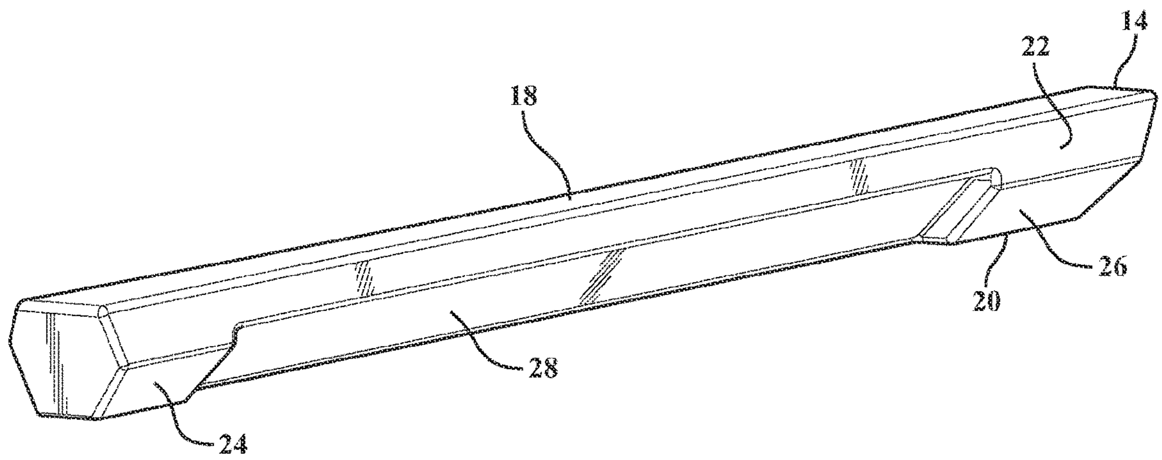
FIG. 3 is a front side perspective view of the hollow housing of the combination step and obstacle side guard of the present invention.
Figure 4:
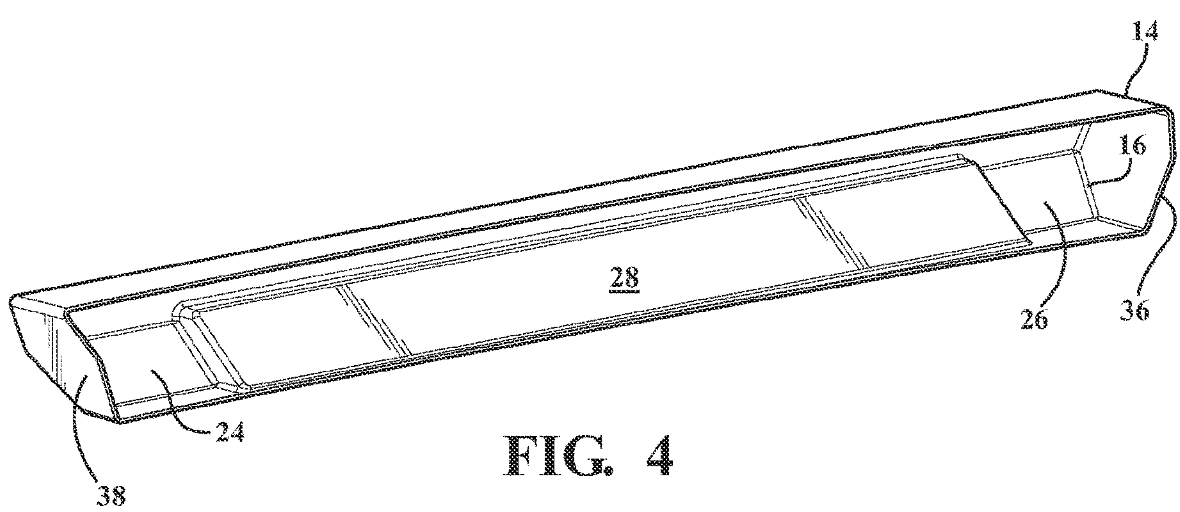
FIG. 4 is a rear side perspective view of the hollow housing of the combination step and obstacle side guard of the present invention.
Figure 5:
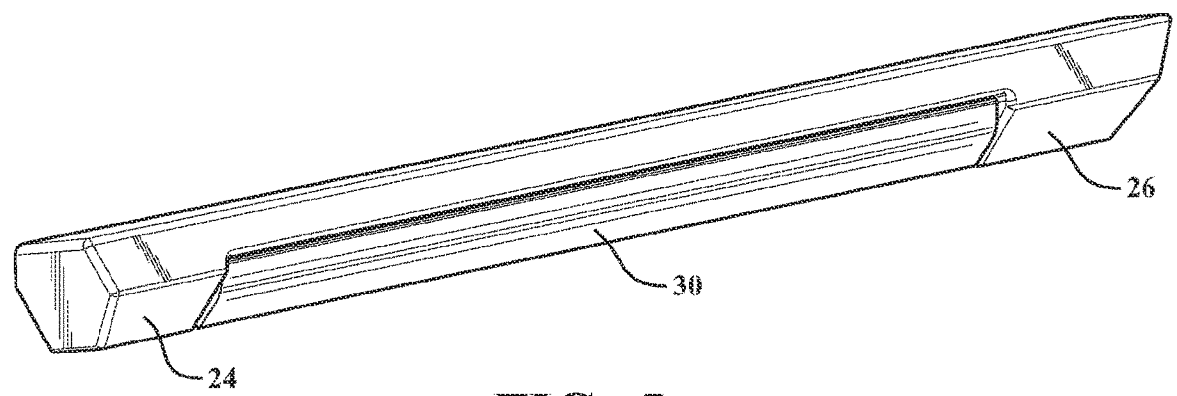
FIG. 5 is a front perspective view the combination step and obstacle side guard of the present invention.

The following description of the preferred embodiment(s) is merely exemplary in nature and is in no way intended to limit the invention, its application, or uses.

Referring now to the drawings there is provided a combination step and obstacle side guard generally shown at 10 for attachment to a vehicle 12.

The combination step and obstacle side guard 10 has a first hollow housing portion 14. Housing 14 includes a hollow interior cavity 16 formed by an outer robust housing which has a top surface step 18 and bottom obstacle guard surface 20 and a side surface 22 is provided. The obstacle guard surface 20 Is generally horizontal to the ground and includes outer slanted surfaces 24 and 26 between surface 20 and surface 22. An inset cavity 28 is formed between side surfaces 24 and 26. End cap surfaces 36 and 38 are provided for enclosing the hollow housing portion 14. Thus, the outer housing has six sides on its outer surface with the top being a horizontal step surface.

Figure 6:
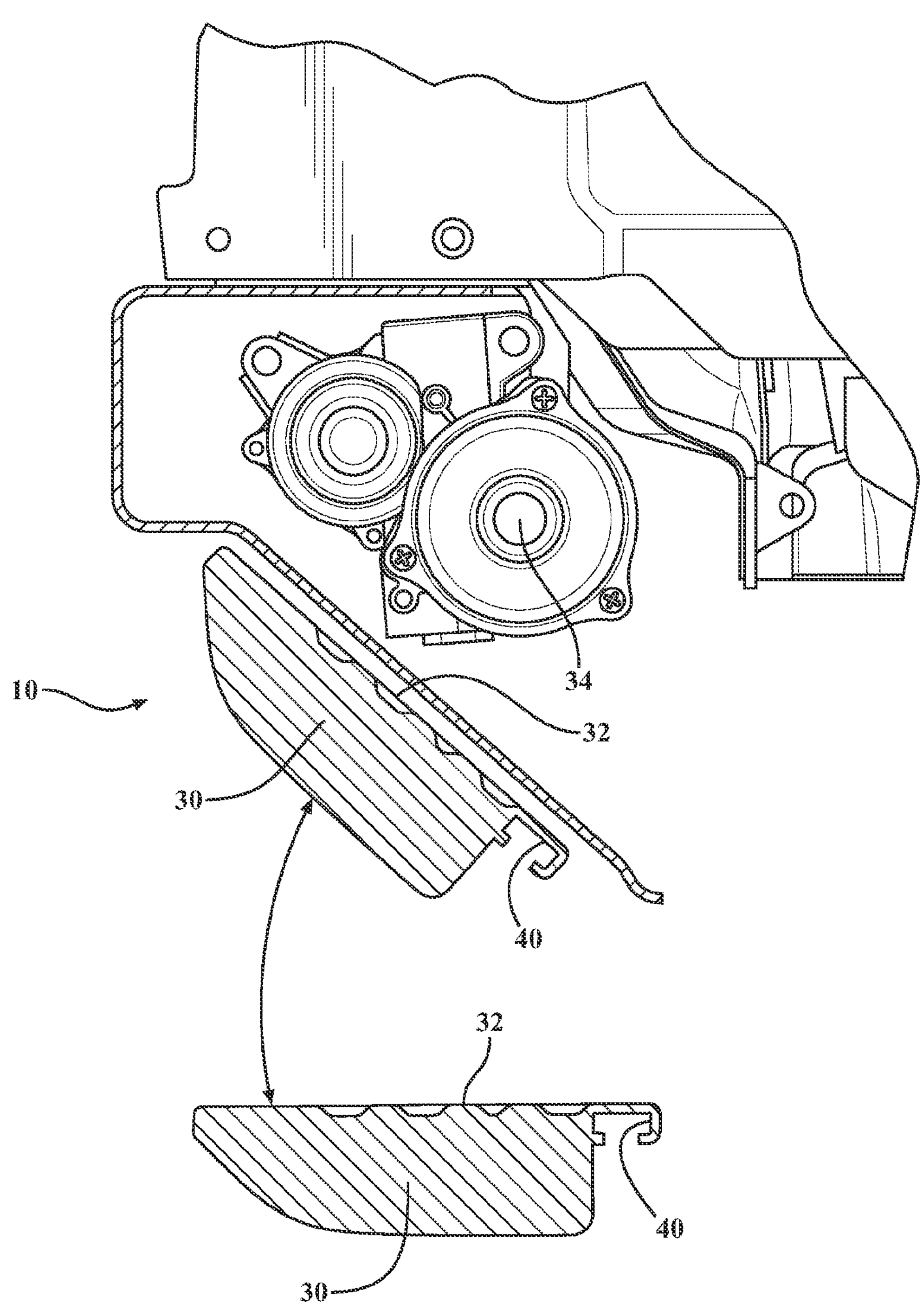
FIG. 6 is a side view partially in phantom showing the drive linkage mechanism of combination step and obstacle side guard of the present invention; and, FIG. 7 is a side perspective view partially in phantom showing the drive linkage mechanism of combination step and obstacle side guard of the present invention.
Figure 7:
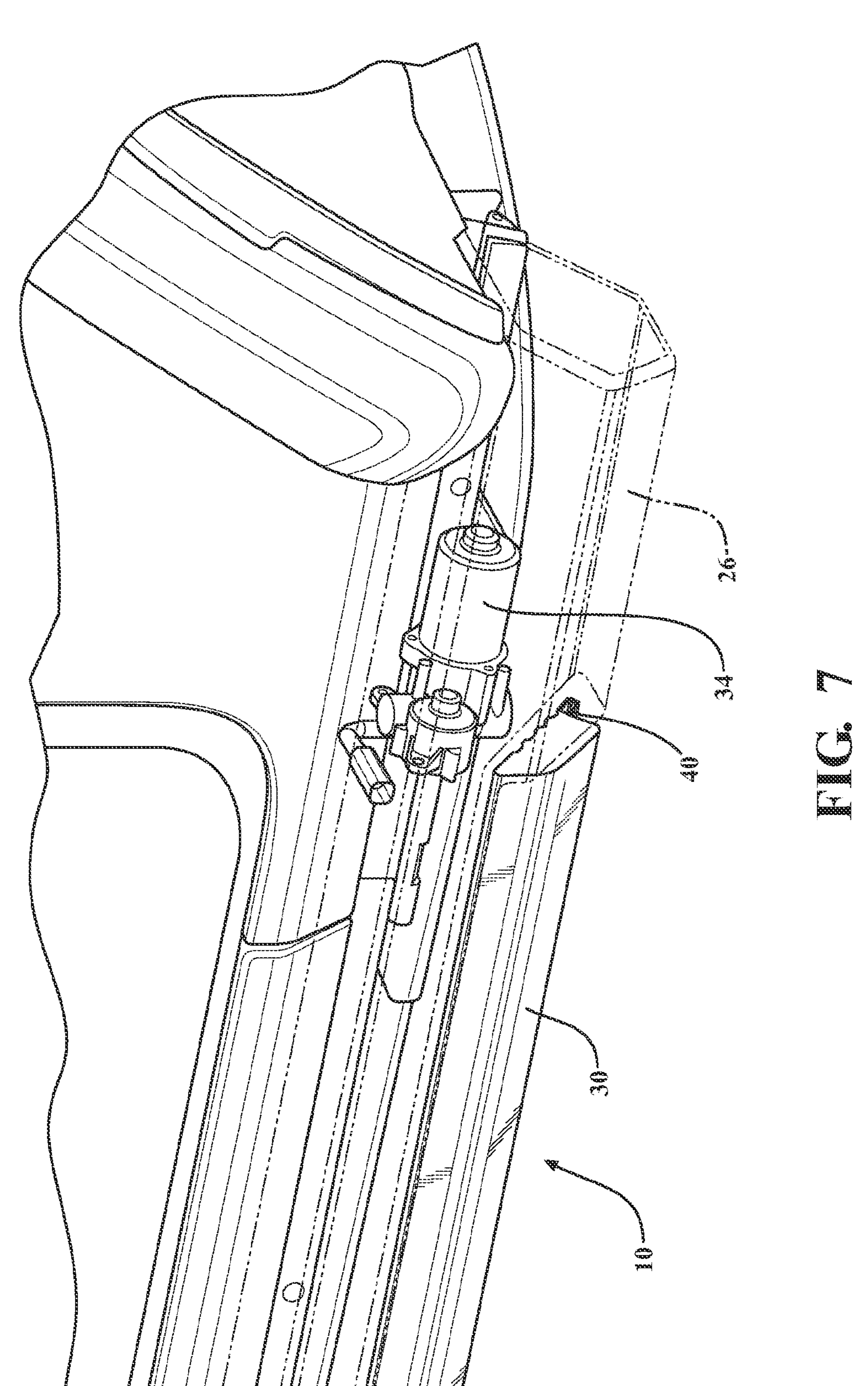

The step and obstacle side guard 10 includes an automated deployable running board 30 which has a step portion 32 which is stowed in the cavity 28. A drive linkage mechanism 34 is provided which is situated within and protected by the hollow interior cavity 16 of the first hollow housing portion 14. The drive mechanism 34 is for driving the step 30 between a stowed position in the inset cavity and a deployed step position as shown in FIG. 6 wherein the step portion 32 can be used for stepping into the vehicle 12.

In operation the step 30 is stowed and forms an outer slide surface that is contiguous with the side portions surfaces 24 and 26 such that if an obstacle is encountered it will slide along the entire surface and protect the vehicle. Then when the vehicle is parked the powered drive mechanism 34 has a four bar linkage that will drop the step down to a level step surface for entering or exiting the vehicle. Such linkages are known in the art of power automated running boards and are adapted for use herein. Linkages suitable in the present invention include four bar linkages shown for example in co-assigned U.S. Pat. No. 10,919,453 by Bradley Watson entitled "Power Box Side Step" issued Feb. 16, 2021 assigned to Magna Exteriors, Inc. which is incorporated herein by reference. The linkage includes a motor 34 for powering the linkage into the deployed or stowed positions. The linkage is configured to engage the T-slot 40 of the step portion and either is configured to go through preconfigured openings in the housing 14 or the like. It is within the scope of the present invention to use a manual linkage which would allow manual opening and closing of the step into the deployed and stowed positions as is known in the art.

The present invention provides "a rock guard" type protective lower side area of a vehicle but also allowing for an automated running board feature for assisting passengers in getting in and out of the vehicle. In the present invention the step is stowed inside of a robust rock guard enclosure and deployable when necessary. The step portion could also be deployed for an extended rock guard or rock slide feature if desired.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A combination step and obstacle side guard for a vehicle comprising:

a first hollow housing portion including an outer robust housing which has a top surface step and bottom obstacle guard surface and a side surface;

said obstacle guard surface including outer edges and forming an inset cavity;

an automated deployable running board which has a step portion which is stowed in said inset cavity;

a drive linkage mechanism comprising a four bar link is situated within and protected by a hollow portion of said first hollow housing portion for driving the step between a stowed position in the inset cavity and a deployed step position wherein the step portion can be used for stepping into the vehicle.

2. The combination step of claim 1 wherein the step is substantially horizontal when deployed and is stowed in the inset when retracted.

3. The combination step of claim 1 wherein the obstacle guard surface is deployed down and outward of the vehicle when in the deployed position and is facing downward in a stowed position for protection of a vehicle from obstacles.

4. The combination step of claim 1 wherein when the step portion is in the stowed position outer surfaces of the step are contiguous with outer surfaces of the first hollow housing portion.

5. The combination step of claim 4 wherein the drive linkage is housed in the first hollow housing portion for protection of the drive linkage.

6. The combination step of claim 5 wherein the drive linkage includes a motor for powering the linkage.

7. The combination step of claim 5 wherein the drive linkage is manually deployed.

8. The combination step of claim 1 wherein there are two separated stair like steps when the step portion is in its deployed state and one step when the step portion is stowed.

9. The combination step of claim 8 wherein the step portion includes a T-channel for connection with the drive linkage.

* * * * *